US009154556B1

(12) United States Patent
Dotan et al.

(10) Patent No.: US 9,154,556 B1
(45) Date of Patent: Oct. 6, 2015

(54) MANAGING ACCESS TO A LIMITED NUMBER OF COMPUTERIZED SESSIONS

(75) Inventors: Yedidya Dotan, Tel Aviv (IL); Lawrence N. Friedman, Arlington, MA (US); Ayelet Biger, Pardes Hanna Karkur (IL); Asaf Shoval, Rishon Le-Zion (IL)

(73) Assignee: EMC Corporation, Hopkinton, MA (US)

( * ) Notice: Subject to any disclaimer, the term of this patent is extended or adjusted under 35 U.S.C. 154(b) by 414 days.

(21) Appl. No.: 13/337,442

(22) Filed: Dec. 27, 2011

(51) Int. Cl.
G06F 15/173 (2006.01)
H04L 29/08 (2006.01)

(52) U.S. Cl.
CPC .............. *H04L 67/14* (2013.01); *H04L 67/143* (2013.01)

(58) Field of Classification Search
CPC ............ H04L 12/5693; H04L 67/1002; H04L 67/1008; H04L 67/14; H04L 67/325; H04L 12/1818; H04L 67/1027; H04L 47/10; H04L 47/12; H04L 47/6215
USPC ......... 709/238, 223, 200, 203, 208, 211, 224, 709/225, 226, 229, 204, 219, 24, 235; 705/80, 7.12, 26.1, 1.1; 455/407, 450, 455/453; 717/178, 122, 121, 113, 110, 108; 370/229, 412; 718/1
See application file for complete search history.

(56) References Cited

U.S. PATENT DOCUMENTS

| 6,707,903 | B2 | 3/2004 | Burok et al. | |
|---|---|---|---|---|
| 7,664,125 | B1 | 2/2010 | Bauer et al. | |
| 8,161,274 | B2 | 4/2012 | Ishimura et al. | |
| 2007/0165608 | A1* | 7/2007 | Altberg et al. | 370/352 |
| 2007/0219816 | A1* | 9/2007 | Van Luchene et al. | 705/1 |
| 2010/0077118 | A1* | 3/2010 | Blackwell et al. | 710/74 |

* cited by examiner

*Primary Examiner* — Waseem Ashraf
*Assistant Examiner* — Charles Murphy
(74) *Attorney, Agent, or Firm* — BainwoodHuang

(57) ABSTRACT

A technique manages access to a limited number of computerized sessions. The technique involves receiving, from a waiting user, a session request for a computerized session, and queuing the session request in a wait queue in response to all of the limited number of computerized sessions being currently assigned to other users. The technique further involves, while the session request is queued in the wait queue, providing permission to the waiting user to un-assign a computerized session which is currently assigned to another user. With such a technique, the user has the option of simply waiting until a computerized session has been relinquished (i.e., if the user is willing to be patient) or un-assigning a computerized session currently assigned to another user (e.g., in order to speed up access to a computerized session).

22 Claims, 5 Drawing Sheets

US 9,154,556 B1

MANAGING ACCESS TO A LIMITED NUMBER OF COMPUTERIZED SESSIONS

BACKGROUND

Situations exist in which people must wait to obtain access to a limited resource. One example is a conventional telephone call handling system for a customer service department. In this example, there may be a limited number of customer service representatives available to take telephone calls from customers.

If there are fewer calling customers than customer service representatives, all of the calling customers may receive immediate attention. However, if there are more calling customers than customer service representatives, some of the customer calls may be put on hold by the telephone call handling system.

While a customer waits on hold to speak to a customer service representative, the telephone call handling system may play music. Additionally, some telephone call handling systems may play a human voice recording which explains that telephone calls will be handled in the order received. Furthermore, some telephone call handling systems may provide an estimate to each caller regarding the amount of time it may take for the caller to speak to an actual customer service representative.

SUMMARY

Unfortunately, there are deficiencies to conventional systems in which people must simply wait to obtain access to a limited resource. For example, in the above-described conventional telephone call handling system, there is only one option available to customers when there are more calling customers than customer service representatives. That is, a customer who is put on hold can either wait patiently until the call is finally answered by an actual customer service representative or, as an alternative, hang up and call back at, hopefully, a less busy time.

In contrast to conventional systems in which people must simply wait to obtain access to a limited resource or return at a less busy time, improved techniques involve providing a user with permission to terminate use of a computerized resource assigned to another user. Along these lines, all of a limited number of computerized sessions may have been assigned to other users. In such a situation, a new user attempting to access a computerized session may be able to terminate assignment of a computerized session to another user under certain circumstances (e.g., when the computerized session has been idle for a period of time). Such operation may provide a more satisfactory experience to waiting users (e.g., users in a hurry are able to obtain quicker access). Additionally, such operation makes more efficient use of resources (e.g., the resources for the idle computerized session may be reassigned to another user more quickly).

One embodiment is directed to a method of managing access to a limited number of computerized sessions (e.g., virtual browser sessions). The method includes receiving, from a waiting user, a session request for a computerized session, and queuing the session request in a wait queue in response to all of the limited number of computerized sessions being currently assigned to other users. The method further includes, while the session request is queued in the wait queue, providing permission to the waiting user to un-assign a computerized session which is currently assigned to another user. In such an embodiment, the user has the option of simply waiting until a computerized session has been relinquished (i.e., if the user is willing to be patient) or un-assigning a computerized session currently assigned to another user in order to speed up access to a computerized session.

Other embodiments are directed to systems, apparatus, processing circuits, computer program products, and so on. Some embodiments are directed to various methods, electronic components and circuitry which are involved in managing access to a limited number of computerized sessions.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves providing a user with permission to terminate use of a computerized resource assigned to another user. Along these lines, suppose that all of a limited number of computerized sessions have been assigned to other users. In such a situation, a new user attempting to access a computerized session may be able to terminate assignment of a computerized session to another user under certain circumstances such as when the computerized session has been idle for a period of time. Such operation may provide a more satisfactory experience to waiting users (e.g., users in a hurry are able to obtain quicker access). Additionally, such operation makes more efficient use of resources (e.g., resources for idle computerized sessions may be put back to work more quickly).

Figure 1:
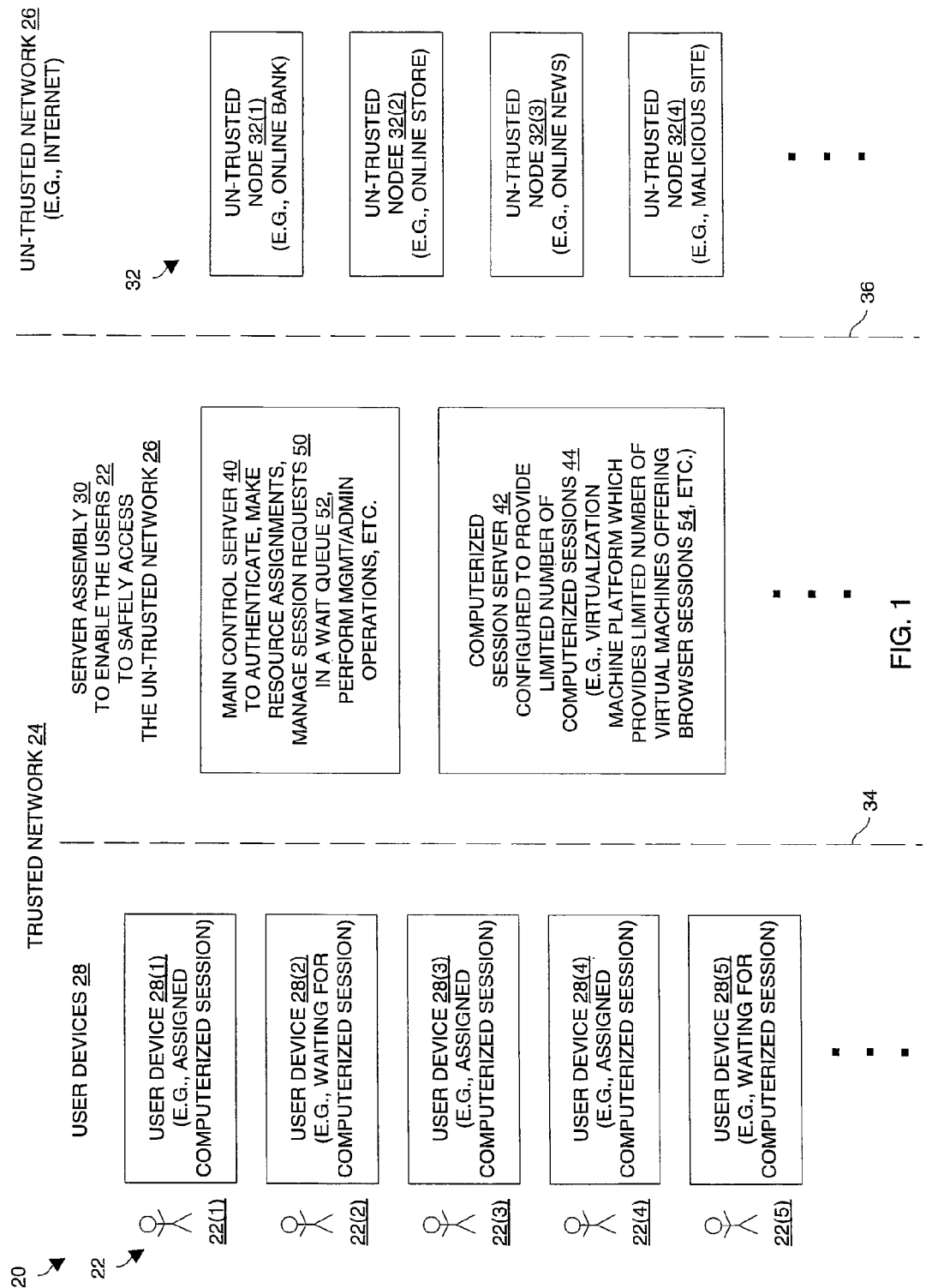
FIG. 1 is a block diagram of an electronic environment within which a user is provided with permission to terminate use of a computerized resource assigned to another user.

FIG. 1 shows an electronic environment 20 within which users 22 are provided with permission to terminate use of computerized resources assigned to other users 22 under certain conditions. The electronic environment 20 includes a trusted network 24 and an un-trusted network 26. The trusted network 24 includes user devices 28 and a server assembly 30. The un-trusted network 24 includes un-trusted nodes 32.

It should be understood that the various components of the electronic environment 20 communicate through electronic communications media. In particular, a dashed line 34 represents the communications medium which enables the user devices 28 to exchange electronic signals with the server assembly 30, and perhaps with each other. Similarly, a dashed line 36 represents the communications medium which enables the server assembly 30 to exchange electronic signals with the un-trusted nodes 32 of the un-trusted network 26. Each of the communications media 34, 36 is capable of having a variety of different topologies including backbone, hub-and-spoke, loop, irregular, combinations thereof, and so on. Along these lines, the communications media 34, 36 may include copper-based data communications devices and cabling, fiber optic devices and cabling, wireless devices, combinations thereof, etc. In some arrangements, parts of the communications media 34, 36 overlap with each other.

Each user device 28 is constructed and arranged to perform useful work on behalf of a user 22 (e.g., respective users 22 can run user level applications on the user devices 28 to create and edit documents, to exchange email, to run specialized applications, etc.). Examples of suitable user devices 28 include appropriately provisioned desktop computers or workstations, laptop or notebook computers, tablets, etc.

The server assembly 30 is constructed and arranged to enable the users 22 of the user devices 28 to safely access the un-trusted nodes 32 of the un-trusted network 26. In particular, the server assembly 30 includes a main control server 40 and one or more computerized session servers 42. The main control server 40 is constructed and arranged to control the overall operation of the server assembly 30 (e.g., perform authentication, management/administrative operations, etc.). Each computerized session server 42 provides a limited number of computerized sessions 44 through which the user devices 28 are able to access the un-trusted network 26. It should be understood that the main control server 40 monitors use of the computerized sessions 44 to determine whether any of the computerized sessions 44 have become idle, i.e., whether any of the computerized sessions 44 have been inactive for a predefined period of time (e.g., 5 minutes, 10 minutes, 15 minutes, etc.). In some arrangements, the main control server 40 considers a computerized session 44 to be idle if that computerized session 44 that has not received any user input (e.g., mouse input, keyboard input, etc.) within the predefined period of time.

The un-trusted nodes 32 may reside on publicly accessible networks (e.g., the Internet) and may perform a variety of different operations. For example, the un-trusted node 32(1) may be an online bank, the un-trusted node 32(2) may be an online store, the un-trusted node 32(3) may be an online news website, the un-trusted node 32(4) may be a malicious site that deploys malware, and so on.

In a particular embodiment which will now be explained in more detail, the computerized session server 42 is provisioned to operate as a virtualization platform which is able to conveniently create and destroy, as the computerized sessions 44, virtual machine sessions having virtual browsers or similar virtual web interfaces. As such, any malware from the un-trusted network 26 (e.g., see the un-trusted node 32(4)) can be easily contained within and removed from the server assembly 30. That is, the malware infects the virtual machines rather than the user devices 28, and any infected virtual machines are simply deleted from the virtual machine platform. As a result, the malware is isolated and prevented from undesirably reaching the user devices 28 and from further contaminating the trusted network 24.

Along these lines, when the electronic environment 20 is in operation, a user 22 of a user device 28 may wish to access the un-trusted network 26. To this end, the user 22 directs the user device 28 to send a session request 50 to the main control server 40 of the server assembly 30 requesting that the main control server 40 assign a computerized session 44 (i.e., hereinafter more conveniently referred to as a browser session 54) to the user 22. If there are enough browser sessions 54 available from the computerized session server 42, the main control server 40 simply assigns an unused browser session 54 to the requesting user 22, and the user 22 then accesses the un-trusted network 26 through the newly assigned browser session 54.

However, it should be understood that there may be more user devices 28 than browser sessions 54. Accordingly, it is possible for the computerized session server 42 to have reached its full capacity, i.e., there are not enough resources for another browser session 54. In this situation, the main control server 40 still processes session requests 50 from the users 22. In particular, the main control server 40 maintains a wait queue 52 of session requests 50, and assigns new browser sessions 54 in response to the queued session requests 50 as capacity for the new browser sessions 54 is restored to the computerized session server 42. For example, one user 22 may finish using an assigned browser session 54 to access the un-trusted network 26 and close that browser session 54. When the user 22 closes the browser session 54, the main control server 40 reclaims the virtual machine platform resources that were consumed by the browser session 54 and reuses these virtual machine platform resources to create a new browser session 54 for use by the user 22 who submitted the next session request 50 in the wait queue 52. Shredding of the old browser session 54 prevents any malware delivered to the old browser session 54 from contaminating other portions of the trusted network 24.

Since virtual machines consume considerable computerized resources, such an embodiment may be well-suited for a corporate setting. In such a setting, the corporate electronic environment (i.e., the trusted network 24) may support many browser sessions 54 for customers in the un-trusted network 26 wishing to access the trusted network 24. For example, the trusted network may be an online bank which provides virtual "browse in" browser sessions 54 to allow bank customers in the un-trusted network 26 to access a banking server in the trusted network 24. However, in terms of employees in the trusted network 24 wishing to access the un-trusted network 26, the corporate electronic environment may support only a limited number of browser sessions 54 to prevent browser session degradation. For example, employees of the online bank may wish to access a limited number of virtual "browse out" browser sessions 54 to access un-trusted nodes 32 on the un-trusted network 26 such as online stores and news sites.

Further details will now be provided as to how waiting users 22 may be given permission to terminate use of idle browser sessions 54 assigned to other users 22. Suppose that the users 22(1), 22(3), 22(4) of user devices 28(1), 28(3), 28(4) have requested browser sessions 54 from the main control server 40 and have been assigned browser sessions 54 by the main control server 40. Further suppose that the users 22(2), 22(5) of user devices 28(2), 28(5) have also requested browser sessions 54 from the main control server 40 but, due to resource limitations, the main control server 40 has placed their session requests 50 in the wait queue 52, i.e., the user 22(2), 22(5) are currently waiting for browser sessions 54 to be assigned.

In this situation, the main control server 40 may provide permission to the waiting users 22 to terminate an idle browser session 54. In particular, one of the users 22 currently assigned a browser session 54 (see users 22(1), 22(3) and 22(4)) may have stopped utilizing an assigned browser session 54 for a predefined amount of time. If a waiting user 22 receives permission to terminate an idle browser session 54 from the main control server 40, the waiting user 22 now has the options of (i) simply waiting for the main control server 40 to assign a browser session 54 to the waiting user 22 in due course, (ii) canceling the session request 50 and leaving in hope of returning when there is an available browser session 54, or (iii) terminating an idle computerized session 44 in order to more quickly receive assignment of a browser session 54.

Since waiting users 22 may be given the ability to terminate idle browser sessions 54, all users 22 enjoy a better overall experience. In particular, impatient users 22 who are unwilling to simply wait are able to terminate an idle browser session 54 and thus receive the benefit of a shorter wait queue 52. Additionally, the server assembly 30 operates more efficiently since the resources consumed by idle browser sessions 54 are put back to use more quickly and the wait queue 52 is not as long. Furthermore, even patient users 22 who are willing to wait without terminating any idle browser sessions 54 receive the benefit of a shorter wait queue 52 due to other users who do terminate idle browser sessions 54.

Moreover, one should appreciate that termination involves idle browser sessions 54 only. That is, assignments of active browser sessions 54 are not terminated. Accordingly, such termination operation is non-interfering since there is no affect on active users 22.

In some arrangements and as will be explained in further detail below, some arrangements involve presenting waiting users 22 with permissions to terminate idle browser sessions 54 in the form of a credit point system (e.g., a game or shopping experience). In these arrangements, waiting users 22 accumulate credit points by waiting, and spend credit points by terminating idle browser sessions 54. Further details will now be provided with reference to FIG. 2.

Figure 2:
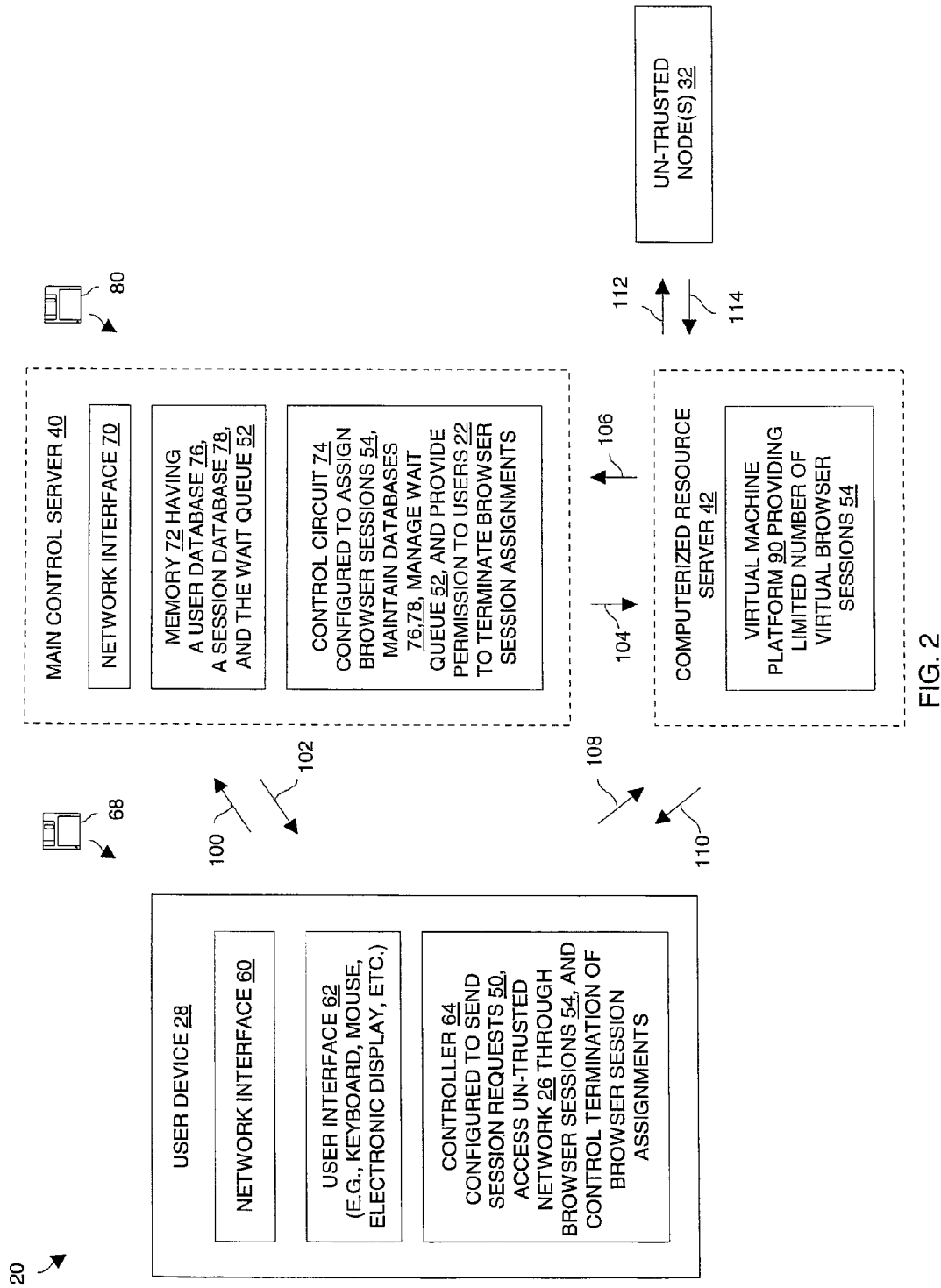
FIG. 2 is a block diagram illustrating particular details of a user device and a server assembly of the electronic environment of FIG. 1.

FIG. 2 shows particular details of a user device 28 and the server assembly 30 of the electronic environment 20. The server assembly 30 is shown as including only one computerized resource server 42 by way of example only. In other arrangements, the server assembly 30 includes multiple computerized resource servers 42 to increase capacity for computerized sessions 44.

The user device 28 includes a network interface 60, a user interface 62 and a controller 64. The network interface 60 is constructed and arranged to connect the user device 28 to the communications medium 34 and thus enables the user device 28 to communicate with the server assembly 30 as well as other devices in the trusted network 24 such as the user devices 28 (also see FIG. 1). In some arrangements, the network interface 80 is implemented in the form of a network card or a network adapter module. In some arrangements, the network interface 80 includes a wireless transceiver for wireless communications.

The user interface 62 of the user device 28 is constructed and arranged to receive input from a user 22 and provide output to the user 22. In some arrangements, the user interface 62 includes a keyboard, a mouse, and a display (e.g., for a workstation or desktop setting). In other arrangements, the user interface 62 includes an integrated touch screen which is responsible for handling both user input and output (e.g., for a portable or hand held setting). Other arrangements are suitable for use as well (e.g., specialized input/output devices, Bluetooth peripheral devices, etc.).

The controller 64 of the user device 28 enables the user device 28 to perform useful work, e.g., run user level applications, request and utilize computerized sessions 44 to access the un-trusted network 26, and so on. It should be understood that the controller 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 68 is capable of delivering all or portions of the software to the user device 28. The computer program product 68 has a non-transitory (or non-volatile) computer readable medium which stores a set of instructions which controls one or more operations of the user device 28. Examples of suitable computer readable storage media include tangible articles of manufacture and apparatus which store instructions in a non-volatile manner such as CD-ROM, flash memory, disk memory, tape memory, and the like.

The main control server 40 of the server assembly 30 includes a network interface 70, memory 72 and a control circuit 74. The network interface 70 is constructed and arranged to connect the main control server 40 to the communications medium 34 (FIG. 1) and thus enables the main control server 40 to communicate with the user devices 28 as well as other devices in the trusted network 24.

The memory 72 includes a user database 76, a session database 78 and the wait queue 52, perhaps among other storage constructs. The user database 76 stores, for each user 22, a user identifier which identifies that user 22, an amount of credit points currently accumulated for that user 22, historical information (e.g., which other users 22 have had browser session assignments terminated by that user 22, which other users 22 have terminated browser session assignments of that user 22, etc.), and so on. Such information may be used by the main control server 40 for authentication, for administrative purposes, and to determine whether that user 22 currently has permission to terminate browser session assignments of other users 22.

The session database 76 stores computerized session data regarding existing computerized sessions 44 currently assigned to the users 22. In the context of browser sessions 54, such data includes, for each existing browser session 54, a browser identifier identifying a particular virtual browser (or virtual machine which is the source of that browser session 54), a user identifier of the user device 28 to which that browser session 54 is assigned, time data (e.g., a start time for the browser session 54, an amount of time that the browser session 54 has been inactive if appropriate, etc.), and so on.

The wait queue 52 stores session requests 50 that are currently awaiting assignment of browser sessions 54 by the main control server 40. When there are more browser sessions 54 available than users 22 in need of browser sessions 54, the wait queue 52 is empty.

The control circuit 74 of the main control server 40 is constructed and arranged to manage assignments of browser sessions 54 provided by the computerized resource server 42 to the users 22 of the user devices 28. It should be understood that the control circuit 74 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the main control server 40. The computer program product 80 has a non-transitory (or non-volatile) computer readable medium which stores a set of instructions which controls one or more operations of the main control server 40. Examples of suitable computer readable storage media include tangible articles of manufacture and apparatus which store instructions in a non-volatile manner such as CD-ROM, flash memory, disk memory, tape memory, and the like.

As mentioned earlier, in one embodiment, each computerized resource server 42 is provisioned to provide a virtualization environment for virtual web browsers. To this end, each computerized resource server 42 includes a virtual machine platform 90 which provides a limited number of virtual browser sessions 54. It should be understood that each computerized resource server 42 is equipped with network connectivity to connect to both the user devices 28 of the trusted network 34 and the un-trusted nodes 32 of the un-trusted network 26 (also see FIG. 1). Further details of how the various components operate will now be provided.

Suppose that the control circuit 74 receives a session request 50 from a user 22 of the user device 28 (see arrow 100 representing communications from the user device 28 to the main control server 40 in FIG. 2). If all of the limited number of browser sessions 54 are currently assigned to other users 22, the control circuit 74 queues the session request 50 in the wait queue 52.

Additionally, while the session request 50 is queued in the wait queue 52, the control circuit 74 determines whether to provide permission to the waiting user 22 to un-assign an idle browser session 54 which is currently assigned to another user 22. Along these lines, the control circuit 74 generates a list of idle browser sessions 54 from the session database 78, and prompts the waiting user 22 to terminate an idle browser session 22 on the list of idle browser sessions 54 if certain criteria are satisfied (see arrow 102 representing communications from the main control server 40 to the user device 28 in FIG. 2).

It should be understood that during this time, the main control server 40 imparts control over each computerized resource server 42 such as directing that computerized resource server 42 to create and destroy virtual machines, etc. (see arrow 104 representing communications from the main control server 40 to the computerized resource server 42 in FIG. 2). Additionally, the main control server 40 receives status from the computerized resource server 42 such as feedback on whether a new virtual machine is available, etc. (see arrow 106 representing communications from the computerized resource server 42 to the main control server 40 in FIG. 2).

Upon receipt of terminate permission from the main control server 40, the waiting user 22 may (i) simply wait for the main control server 40 to assign a browser session 54 to the waiting user 22 when resources become available (e.g., when another user closes an existing browser session 54), (ii) cancel the session request 50 and leave in hope of returning when there is an available browser session 54, or (iii) use the provided permission to terminate an idle browser session 54 in order to more quickly receive assignment of a browser session 54.

If the waiting user 22 simply waits, the main control server 40 will eventually process the session request 50 of the waiting user 22 from a head of the wait queue 52 and assign a new browser session 54 to the waiting user 22 (see arrow 102). In response, the user 22 of the user device 28 is then able to access an un-trusted node 32 by providing input to the browser session 54 and receiving output from the browser session 54 (see arrows 108, 110 representing communications between the user device 22 and the computerized resource server 42 in FIG. 2). The browser session 54 communicates directly with the un-trusted node 32 to shield the user device 28 from exposure to malware (see arrows 112, 114 representing communications between the computerized resource server 42 and the un-trusted node 32 in FIG. 2).

However, if the waiting user 22 cancels the session request 50, the waiting user 22 sends a cancel command to the main control server 40 (represented by arrow 100). In turn, the main control server 40 deletes the session request 50 from the wait queue 52 and sends acknowledgement back to the waiting user 22 (represented by arrow 102).

Furthermore, if the waiting user 22 uses the permission to terminate assignment of an idle browser session 54 to another user 22, the waiting user 22 sends a terminate command to the main control server 40 (arrow 100). In response to the terminate command, the main control server 40 directs the computerized resource server 42 to close the idle browser session 54 assigned to the other user 22 and provide a new browser session 54 for assignment to a new user 22 (arrows 104, 106). The main control server 40 then updates: (i) the user database 76 to reflect use of the permission, (ii) the session database 76 to reflect termination of the earlier assignment and creation of a new assignment of the new browser session 54 to a new user 22, and (iii) the wait queue 52 to reflect the new assignment of the new browser session 54 to the new user 22. Accordingly, the wait queue 52 is now shorter and the resources of the terminated idle browser session 54 are put back to use more quickly. As a result, there is higher user satisfaction provided to the users 22 of the user devices 22 vis-à-vis a conventional system in which there is no termination alternative. Further details will now be provided with reference to FIG. 3.

Figure 3:
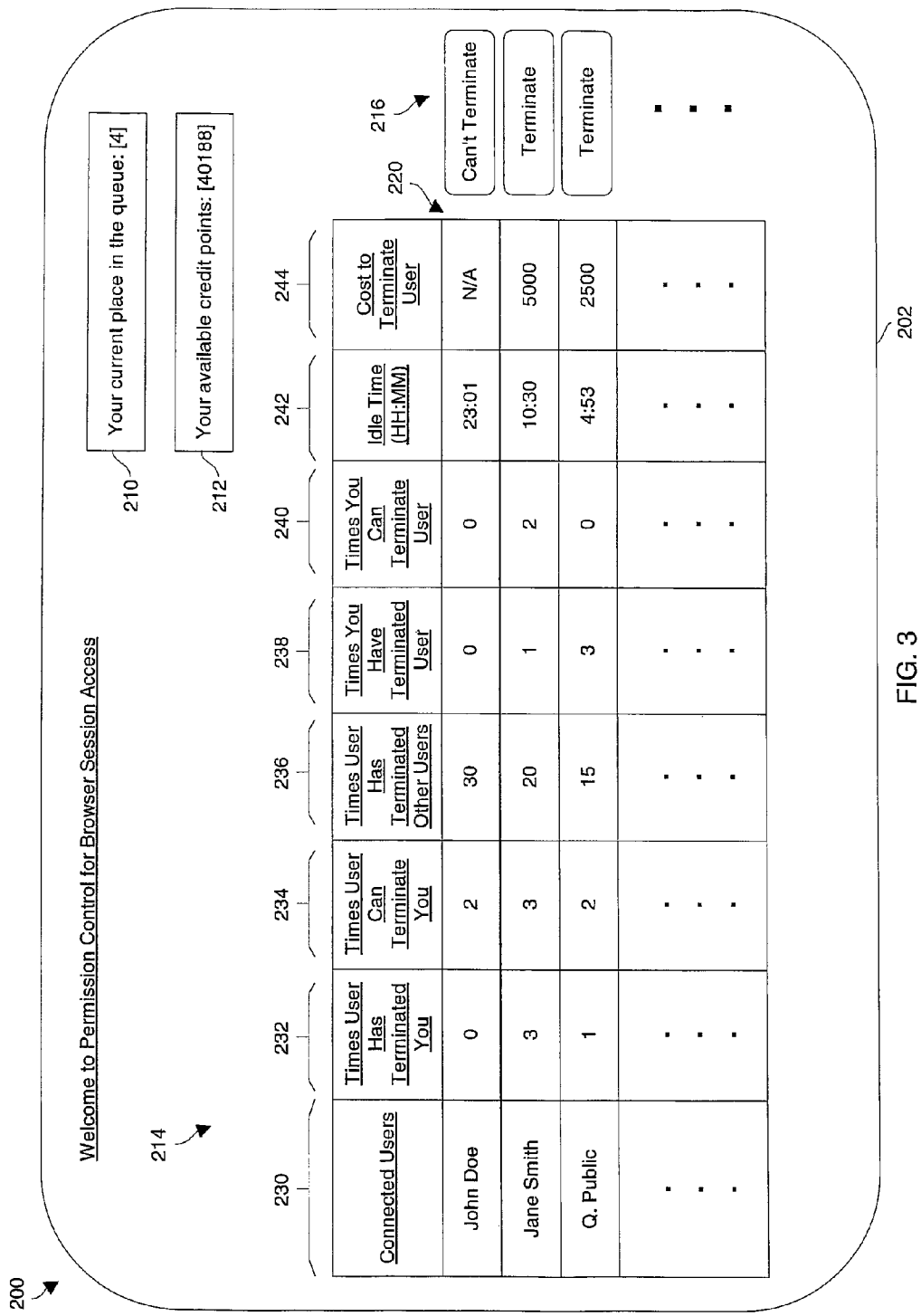
FIG. 3 is a diagram of an example graphical user interface (GUI) screen shot which is capable of being displayed by the user device of FIG. 2.

FIG. 3 is an example screen shot 200 of a graphical user interface (GUI) 202 rendered by the user device 28 to a particular user 22 when a session request 50 sent to the main control server 40 from the user device 28 is placed in the wait queue 52. The graphical output is rendered on an electronic display portion of the user interface 62, and input is received through an input portion of the user interface 62 such as a mouse, a keyboard and/or a touch screen (also see FIG. 2).

The example screen shot 200 includes a pane 210 which outputs a current position of the particular user's session request 50 in the wait queue 52, and a pane 212 which outputs a total number of credit points which are available for use by the particular user 22. The example screen shot 200 further includes a table 214 of users 22 who are currently assigned to browser sessions 54 which have been idle for a predefined amount of time (e.g., at least 10 minutes), and a set of cells (or buttons) 216 some of which the particular user may be able to activate in order to un-assign an idle browser session 54. Each cell 216 provides an indication as to whether the waiting user 22 has permission to terminate assignment of a browser session 54.

The table 214 of users 22 currently assigned to idle browser sessions 54 includes a row 220 for each user 22, e.g., "John Doe", "Jane Smith", "Q. Public", etc. Each row 220 includes termination history such as (i) a cell 230 containing the name of the respective user 22 (ii) a cell 232 containing the number of times the respective user 22 has terminated an idle browser session 54 assigned to the particular user 22, (iii) a cell 234 containing the number of times the respective user 22 can terminate an idle browser session 54 assigned to the particular user 22 in the future, (iv) a cell 236 containing the total number of times the respective user 22 has terminated idle browser sessions 54 of other users 22, (v) a cell 238 containing the total number of times the particular user 22 has terminated that respective user 22, (vi) a cell 240 containing the total number of times the particular user 22 can terminate that respective user 22 in the future, (vii) a cell 242 containing amount of time that the browser session 54 assigned to that respective user 22 has been idle, and (viii) a cell 144 containing a cost, in credit points, to terminate the idle browser session 54 of the respective user 22. In some arrangements, each row 220 includes additional cells containing additional data (e.g., status in an organization, etc.). In other arrangements, each row 220 includes fewer cells than those shown in FIG. 3.

If the cell 216 immediately adjacent a row 220 indicates that the particular user 22 cannot terminate the idle browser session 54 of that respective user 22, the particular user 22 does not have permission to terminate the idle browser session 54 of that respective user 22. In the example, the particular user 22 does not have permission to terminate the idle browser session 54 of "John Doe".

However, if the cell 216 immediately adjacent a row 220 indicates that the particular user 22 can terminate the idle browser session 54 of that respective user, the particular user 22 has permission to terminate the idle browser session 54 of that respective user 22. In the example, the particular user 22 has permission to terminate the idle browser sessions 54 of "Jane Smith" and "Q. Public".

During operation, the main control server 40 sends signals to the user device 22 updating the information in the panes 210, 212 and the table 214 in real time. In particular, when the main control server 40 removes a session request 50 from the head of the wait queue 52 and fulfills that session request 50, the main control server 40 updates the pane 212 to reflect the new current position of the particular user's session request 50 in the wait queue 52. Additionally, as time passes, the particular user 22 accumulates more credit points and the main control server 40 updates the pane 214 to reflect an increase in accumulated credit points. Furthermore, the main control server 40 updates the rows of the table 214 of users 22 who are currently assigned to idle browser sessions 54 since those users 22 may finish using the idle browser sessions 54 or be terminated by other users 22.

With the session access information for the particular user 22 displayed in the screen shot 200, suppose that the particular user 22 activates the cell 216 for "Jane Smith" to terminate the idle browser session 54 of "Jane Smith". In response, the main control server 40 subtracts 5000 credit points from the particular user 22 and reflects that in the cell 212 (i.e., 5000 credit points is the cost of exercising that termination permission). Additionally, the main control server 40 terminates the idle browser session 54 of "Jane Smith" thus moving the particular user 22 forward in the wait queue 52, and updates its databases and the remaining portions of the GUI 202. In some arrangements, the main control server 40 provides a report notice to "Jane Smith" indicating that the particular user 22 terminated assignment of the idle browser session 54. In some arrangements, the main control server 40 is constructed and arranged to move the particular user 22 forward by multiple positions (e.g., two places) in the wait queue 52 as a further incentive to the particular user 22 to terminate idle browser sessions 54.

It should be understood that the above-described termination system may be configured in a variety of ways to make the user experience more enjoyable. For example, in some arrangements, the particular user 22 is allowed to terminate only a predefined maximum number of idle browser sessions 54 (e.g., one, two, three, etc.) for a single session request 50. In other arrangements, there is no maximum and the particular user 22 is allowed to terminate any number of idle browser sessions 54 as long as the particular user 22 has enough credit points (see the cell 212).

In some arrangements, the number of times the particular user 22 can terminate the idle browser session 54 of another user 22 increases incrementally each time the other user 22 terminates the idle browser session 54 of the particular user 22. Accordingly, even if the particular user 22 has enough credit points, the particular user 22 may be prohibited from terminating the idle browser session 54 of a certain other user 22 if that other user 22 has not terminated the idle browser session 54 of the particular user 22. However, once the other user 22 terminates a idle browser session 54 of the particular user 22, the particular user 22 is now able to terminate the idle browser session 54 of the other user 22 in the future.

In some arrangements, the users 22 of the trusted network 24 belong to a company and are grouped into individual organizations within the company. Such organizational/hierarchical information (i.e., org chart data) can be stored in and provided by the user database 76 (FIG. 2). In these arrangements, a user 22 may be prevented from receiving permission to terminate idle browser sessions 54 of users 22 that are outside that user's organization. Additionally, in some arrangements, executives of the company (who are users 22) may be excluded so that no users 22 receive permission to terminate the idle browser sessions 54 of the executive users 22.

In some arrangements, the cost to terminate the idle browser sessions 54 of each user 22 may vary (e.g., 2500 credit points, 5000 credit points, etc.) based on certain factors. Such factors affecting the cost of terminating an idle browser session 54 of a user 22 can include that user's status within the company, how frequently that user 22 terminates idle browser sessions 54 of other users 22, how frequently the idle browser sessions 54 of that user 22 have been terminated, and so on.

In some arrangements, credit points start accumulating as soon as the user 22 queues a session request 50 in the wait queue 52. In other arrangements, credit points start accumulating only after residing a predetermined amount of time in the wait queue 52 (e.g., one minute, two minutes, etc.). Further details will now be provided with reference to FIG. 4.

Figure 4:
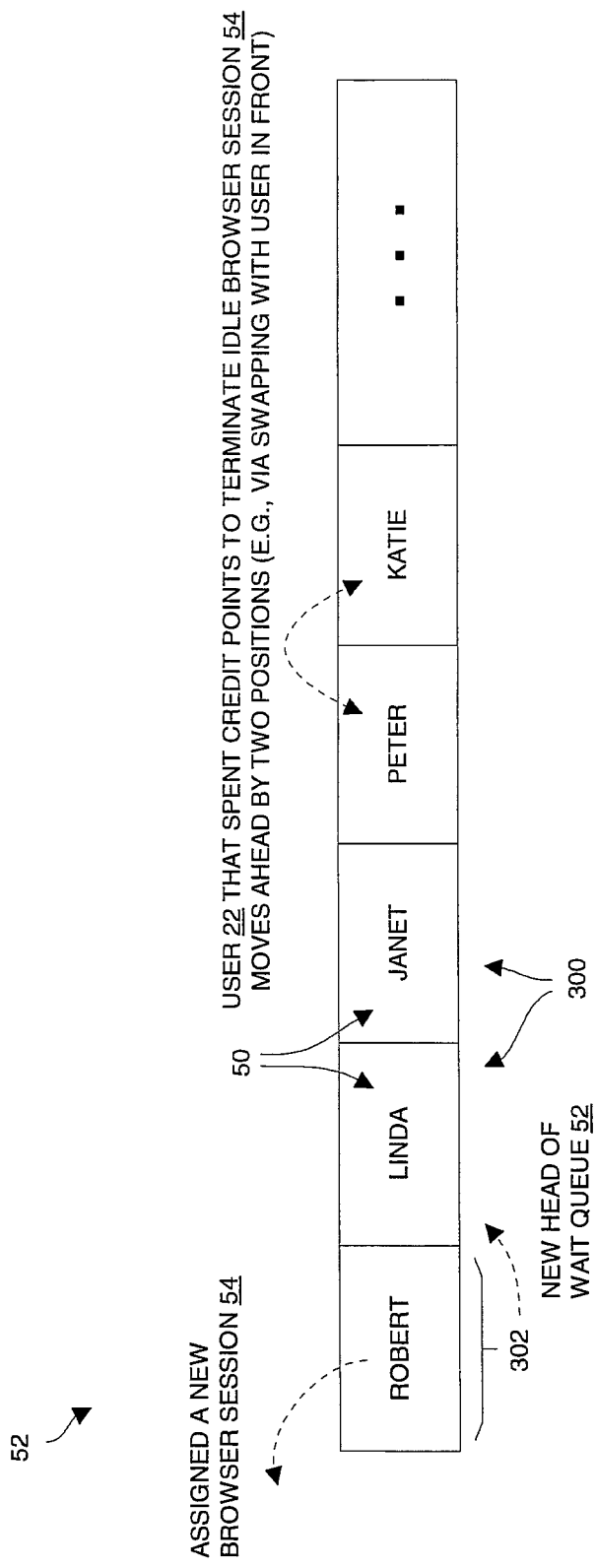
FIG. 4 is a diagram which illustrates example details of a wait queue which is managed by the server assembly of FIG. 2.

FIG. 4 shows example details of the wait queue 52 which is managed by the control circuit 74 of the main control server 40. As shown, the wait queue 52 includes multiple entries 300 containing session requests 50. The session request 50 at the head 302 of the wait queue 52 contains the session request 50 which is to be process next by the main control server 40 when the next browser session 54 becomes available.

In the example of FIG. 4, "Robert" is initially at the head 302 of the wait queue 52 and is thus the next user 22 scheduled to be assigned the next available browser session 54, followed by "Linda", "Janet", "Peter", "Katie", and so on. For simplicity, names are used in the example, but it should be understood that the entries 300 of the wait queue 52 can contain user identifiers, user device identifiers, timestamps, combinations thereof, etc.

While the users 22 wait, their credit points accumulate. Some users 22 may be perfectly content waiting and thus save their credit points for use in the future, i.e., "for a rainy day". However, suppose that "Katie" decides to terminate an idle browser session 54 of the server assembly 30 (also see FIGS. 1 and 2). Accordingly, "Katie" activates a termination cell 216 on the GUI 202 of her user device 28 to terminate an idle browser session 54 (also see FIG. 3). In response, her user device 28 sends the main control server 40 a terminate command and the main control server 40 processes the terminate command by directing the computerized session server 42 (FIGS. 1 and 2) to terminate the selected idle browser session 54, reclaim the resources consumed by that idle browser session 54, and create a new browser session 54.

When the new browser session 54 is ready for assignment, the main control server 40 assigns the new browser session 54 to "Robert" and deletes the "Robert" session request 50 from the head 302 of the wait queue 52. Accordingly, the entry 300 containing "Linda" becomes the new head 302 of the wait queue 52 (see the single dashed arrows in FIG. 4).

In some arrangements, the user 22 that spent credit points to terminate an idle browser session 54 (i.e., "Katie") is rewarded by moving up the session request 50 of that user 22 one or more additional positions. In the example of FIG. 4, "Linda" moves ahead simply by one position (i.e., the "Linda" session request 50 is now in the head entry 300). Additionally, "Janet" moves ahead simply by one position (i.e., the "Janet" session request 50 used to be third in the wait queue 52 but is now second in the wait queue 52). Furthermore, "Katie" moves ahead by two positions since "Katie" invoked her termination permission by swapping positions with "Peter" (i.e., the "Katie" session request 50 moves from the fifth position to the third position, and the "Peter" session request 50 remains in fourth in the wait queue 52).

It should be understood that since some waiting users 22 will tend invoke their permission to terminate idle browser sessions 54, the wait queue 52 in general will be shorter than a comparable wait queue that does not offer termination. Further details will now be provided with reference to FIG. 5.

Figure 5:
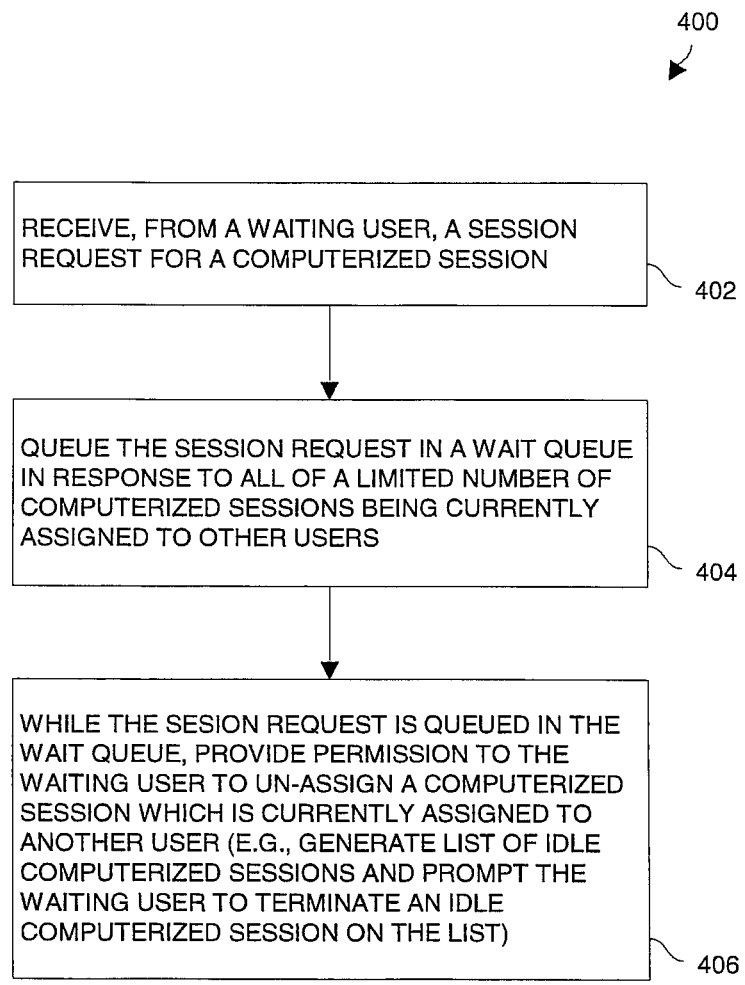
FIG. 5 is a flowchart of a procedure which is performed by the electronic environment of FIG. 1.

FIG. 5 is a flowchart of a procedure 400 which is performed by circuitry of the electronic environment 20 to manage access to a limited number of computerized sessions 44. In the context of the above-described browser sessions 54 of a virtual machine environment, such a procedure 400 was performed primarily by the control circuit 74 of the main control server 40. However, it should be understood that parts or even all of the procedure 400 can be performed by other circuits (e.g., by the computerized resource server 42, by the user devices 28, in a distributed manner, etc.).

In step 402, the circuitry receives, from a waiting user, a session request 50 for a computerized session 44. In particular, the user 22 of a user device 28 requests access to a computerized session 44.

In step 404, the circuitry queues the session request 50 in a wait queue 52 in response to all of the limited number of computerized sessions 44 being currently assigned to other users 22. Here, there are more users 22 wanting access than there are available computerized sessions 44.

In step 406, while the session request 50 is queued in the wait queue 52, the circuitry provides permission to the waiting user 22 to un-assign a computerized session 44 which is currently assigned to another user 22. Such permission may be provided to the waiting user 22 under certain conditions such as when there are idle computerized sessions 44, when the waiting user 22 has accumulated enough credit points, etc. Along these lines, a list of idle computerized sessions 44 may be generated and the waiting user 22 may be prompted to terminate an idle computerized session 44 on the list.

As mentioned earlier, different users 22 may react differently when receiving such permission. In particular, the waiting user 22 may (i) patiently wait for a computerized session 44 to be assigned once resources become available (e.g., when another user 22 closes an existing computerized session 44), (ii) cancel the session request 50 and leave in hope of returning when there is an available computerized session 44, or (iii) use the provided permission to terminate an idle computerized session 44 in order to shorten the wait queue 52 and more quickly receive assignment of a computerized session 44.

As described above, improved techniques involve providing a user 22 with permission to terminate use of a computerized resource assigned to another user 22. Along these lines, all of a limited number of computerized sessions 44 may have been assigned to other users 22. In such a situation, a new user 22 attempting to access a computerized session 44 may be able to terminate assignment of a computerized session 44 to another user 22 under certain circumstances (e.g., when the computerized session 44 has been idle for a period of time). Such operation may provide a more satisfactory experience to waiting users 22 (e.g., users in a hurry are able to obtain quicker access). Additionally, such operation makes more efficient use of resources (e.g., the resources for the idle computerized session 44 may be reassigned to another user 22 more quickly).

While various embodiments of the invention have been particularly shown and described, it will be understood by those skilled in the art that various changes in form and details may be made therein without departing from the spirit and scope of the invention as defined by the appended claims.

For example, the computerized sessions 44 were described above as being virtual browser sessions 54 which allow users 22 to access un-trusted nodes 32 from a trusted network 24. It should be understood that the above-described techniques are suitable for managing access to other types of computerized sessions 44 as well. Examples include managing access to a limited number of online game sessions, remotely accessing cameras, managing positions in a reservation queue such as an electronic wait list of an airline, accessing a computerized processing engine and/or other limited resources and reservation services through a general web interface, and so on.

Additionally, it should be understood that the main control server 40 and the computerized resource server 42 of the server assembly 30 were shown as being separate machines. In other arrangements, the main control server 40 and the computerized resource server 42 are co-located in a single machine, or cloud distributed within the trusted network 24.

Furthermore, it should be understood that access to the server assembly 30 may be provided as a hosted service. For example, a corporation may hire a third-party to supply, operate and/or maintain all or portions of the server assembly 30. Such modifications and enhancements are intended to belong to various embodiments of the invention.

What is claimed is:

1. In electronic circuitry, a method of managing access to a limited number of computerized sessions, the method comprising:

receiving, from a waiting user, a session request for a computerized session to be run on a server in a trusted network for interacting with an untrusted node outside the trusted network;

queuing the session request in a wait queue in response to all of the limited number of computerized sessions being currently assigned to other users, the method accumulating credit points for the waiting user for time spent by the waiting user waiting in the wait queue, the method allowing the waiting user to spend the waiting user's credit points to un-assign a computerized session which is currently assigned to another user if the waiting user has a sufficient number of credit points; and while the session request is queued in the wait queue, providing permission to the waiting user to un-assign a computerized session which is currently assigned to another user;

wherein providing the permission to the waiting user to un-assign the computerized session which is currently assigned to another user includes generating a list of idle computerized sessions including a number of credit points needed to un-assign each idle computerized session, and prompting the waiting user to terminate an idle computerized session on the list of idle computerized sessions, wherein the server runs a virtual machine platform that provides, as the limited number of computerized sessions, a limited number of virtual web interfaces running on virtual machines through which users are capable of accessing web sites outside a trusted network, the virtual machines operating on the server to provide destructible interfaces between the trusted network and nodes outside the trusted network and to protect user devices of the waiting users from malware arriving from outside the trusted network; and wherein generating the list of idle computerized sessions includes identifying particular virtual web interfaces which have gone unused by users assigned to the particular virtual web interfaces for a predefined amount of time.

2. A method as in claim 1 wherein prompting the waiting user to terminate an idle computerized session on the list of idle computerized sessions includes:

supplying session access information to the waiting user, the session access information including a current position of the session request within the wait queue.

3. A method as in claim 2 wherein supplying the access information to the waiting user includes:

identifying multiple idle computerized sessions to the waiting user, the waiting user being permitted to terminate one of the multiple idle computerized sessions.

4. A method as in claim 3, further comprising:

receiving, from the waiting user, a terminate command to terminate assignment of a particular idle computerized session to another user, and in response to the terminate command, terminating the assignment of the particular idle computerized session to the other user and decreasing the current number of credit points available to the waiting user.

5. A method as in claim 4, further comprising:

in response to termination of the assignment of the particular idle computerized session to the other user, changing the current position of the session request within the wait queue from an existing position to a new position.

6. A method as in claim 5 wherein the session request within the wait queue is the Xth session request in the wait queue immediately before changing the current position of the session request within the wait queue; and wherein changing the current position of the session request in the wait queue includes adjusting the current position of the session request from being the Xth session request in the wait queue to being the (X-2)th session request in the wait queue.

7. A method as in claim 4, further comprising:

in response to termination of the assignment of the particular idle computerized session to the other user, sending a report message to the other user, the report message indicating that the waiting user terminated the assignment of the particular idle computerized session to the other user.

8. A method as in claim 4, further comprising:

in response to termination of the assignment of the particular idle computerized session to the other user, adjusting a termination history of the other user to record termination by the waiting user.

9. A method as in claim 4, further comprising:

in response to termination of the assignment of the particular idle computerized session to the other user, adjusting a termination history of the waiting user to record termination by the waiting user.

10. A method as in claim 3 wherein identifying the multiple idle computerized sessions to the waiting user includes:

identifying a first idle computerized session and a first credit point cost to terminate assignment of the first idle computerized session to a first other user, and identifying a second idle computerized session and a second credit point cost to terminate assignment of the second idle computerized session to a second other user, the second credit point cost being different than the first credit point cost.

11. A method as in claim 10, further comprising:

prior identifying the multiple idle computerized sessions to the user, calculating, as the first credit point cost, a first termination price based on a termination history of the first other user and calculating, as the second credit point cost, a second termination price based on a termination history of the second other user.

12. A method as in claim 1 wherein prompting the waiting user to terminate an idle computerized session on the list of idle computerized sessions includes:

identifying an immune idle computerized session on the list of idle computerized sessions, the immune idle computerized session being immune from termination.

13. A method as in claim 1 wherein prompting the waiting user to terminate an idle computerized session on the list of idle computerized sessions includes:

displaying a table of assignment entries based on the list of idle computerized sessions, each assignment entry identifying (i) a respective user assigned an computerized sessions, (ii) a termination history of the respective user, (iii) an amount of time that the computerized session assigned to the respective user has been idle, and (iv) an indication whether the waiting user has permission to terminate assignment of the computerized session to the respective user.

14. A method as in claim 1 wherein providing permission to the waiting user to un-assign a computerized session which is currently assigned to another user includes displaying, on a graphical user interface to the waiting user, a current position of the waiting user in the wait queue, a total number of credit point which are available for use by the waiting user, an identification of a plurality of other users with computerized sessions which have been idle for a predefined amount of time, and a number of credit points needed to terminate each of the plurality of other users.

15. A method as in claim 14 wherein providing permission further includes displaying, on the graphical user interface, a number of times each of the plurality of other users has terminated a session of the waiting user.

16. A method as in claim 1 further including the virtual machine shredding the virtual web interface in response to detecting malware running in the virtual web interface to prevent the malware from reaching a user device inside the trusted network.

17. A method as in claim 1 wherein the method further includes a request for one of a browser session, a game session, and a remotely accessed camera session.

18. A method as in claim 1 wherein the method further includes a request for one of a session managing positions in a reservation queue, a session accessing a computerized processing engine, and a session on a reservation services system.

19. A client device, comprising:

a communications interface constructed and arranged to connect to a communications network;

a user interface; and a controller coupled to the communications interface and the user interface, the controller being constructed and arranged to:

receive a command to obtain access to a computerized session to be run on a server in a trusted network for interacting with an untrusted node outside the trusted network from a user through the user interface, after receiving the command, queue a session request in a wait queue on a server through the communications interface in response to all of a limited number of computerized sessions being currently assigned to other users, the controller accumulating credit points for the waiting user for time spent by the waiting user waiting in the wait queue, the controller allowing the waiting user to spend the accumulating credit points to un-assign a computerized session which is currently assigned to another user if the waiting user has a sufficient number of credit points; and while the session request is queued in the wait queue, presenting permission to the waiting user through the user interface to un-assign a computerized session which is currently assigned to another user;

wherein the controller is constructed and arranged to provide the permission to the waiting user to un-assign the computerized session which is currently assigned to another user includes generating a list of idle computerized sessions and prompt the waiting user to terminate an idle computerized session on the list of idle computerized sessions, and wherein the server runs a virtual machine platform that provides, as the limited number of computerized sessions, a limited number of virtual web interfaces running on virtual machines through which users are capable of accessing web sites outside a trusted network, the virtual machines operating on the server to provide destructible interfaces between the trusted network and nodes outside the trusted network and to protect user devices of the waiting users from malware arriving from outside the trusted network; and wherein generating the list of idle computerized sessions includes identifying particular virtual web interfaces which have gone unused by users assigned to the particular virtual web interfaces for a predefined amount of time.

20. A computer program product having a non-transitory computer readable medium which stores a set of instructions for managing access to a limited number of computerized sessions, the set of instructions causing a client device to perform a method of:

receiving a command to obtain access to a computerized session to be run on a server in a trusted network for interacting with an untrusted node outside the trusted network from a user;

after receiving the command, queuing a session request in a wait queue on a server in response to all of a limited number of computerized sessions being currently assigned to other users, the waiting user accumulating credit points for time spent waiting in the wait queue; and while the session request is queued in the wait queue, presenting permission to the waiting user to un-assign a computerized session which is currently assigned to another user;

wherein further providing the permission to the waiting user to un-assign the computerized session which is currently assigned to another user includes generating a list of idle computerized sessions including a number of credit points needed to un-assign each idle computerized session, and prompting the waiting user to terminate an idle computerized session on the list of idle computerized sessions, and wherein the server runs a virtual machine platform that provides, as the limited number of computerized sessions, a limited number of virtual web interfaces running on virtual machines through which users are capable of accessing web sites outside a trusted network, the virtual machines operating on the server to provide destructible interfaces between the trusted network and nodes outside the trusted network and to protect user devices of the waiting users from malware arriving from outside the trusted network; and wherein generating the list of idle computerized sessions includes identifying particular virtual web interfaces which have gone unused by users assigned to the particular virtual web interfaces for a predefined amount of time.

21. A server device, comprising:

a communications interface constructed and arranged to connect to a communications network;

a wait queue; and a control circuit coupled to the communications interface and the wait queue, the control circuit being constructed and arranged to:

receive, from a waiting user, a session request for a computerized session, queuing the session request in the wait queue in response to all of the limited number of computerized sessions being currently assigned to other users, and while the session request is queued in the wait queue, providing permission to the waiting user to un-assign a computerized session which is currently assigned to another user;

wherein further providing the permission to the waiting user to un-assign the computerized session which is currently assigned to another user further includes generating a list of idle computerized sessions and prompting the waiting user to terminate an idle computerized session on the list of idle computerized sessions based upon the waiting user having accumulating sufficient credit points for time spent waiting in the wait queue, both for time spent waiting for the current computerized session and for time spent waiting for any previous computerized sessions, to un-assign a computerized session which is currently assigned to another user, and wherein the server runs a virtual machine platform that provides, as the limited number of computerized sessions, a limited number of virtual web interfaces running on virtual machines through which users are capable of accessing web sites outside a trusted network, the virtual machines operating on the server to provide destructible interfaces between the trusted network and nodes outside the trusted network and to protect user devices of the waiting users from malware arriving from outside the trusted network; and wherein generating the list of idle computerized sessions includes identifying particular virtual web interfaces which have gone unused by users assigned to the particular virtual web interfaces for a predefined amount of time.

22. A computer program product having a non-transitory computer readable medium which stores a set of instructions for managing access to a limited number of computerized sessions, the set of instructions causing a sever device to perform a method of:

receiving, from a waiting user, a session request for a computerized session to be run on the server in a trusted network for interacting with an untrusted node outside the trusted network;

queuing the session request in a wait queue in response to all of the limited number of computerized sessions being currently assigned to other users, the method accumulating credit points for the waiting user for time spent by the waiting user in the wait queue, the method allowing the waiting user to spend the waiting user's credit points to un-assign a computerized session which is currently assigned to another user if the waiting user has a sufficient number of credit points for that specific idle computerized session; and while the session request is queued in the wait queue, providing permission to the waiting user to un-assign a computerized session which is currently assigned to another user;

wherein providing permission to the waiting user to un-assign the computerized session which is currently assigned to another user includes generating a list of idle computerized sessions and prompting the waiting user to terminate an idle computerized session on the list of idle computerized sessions, and between the trusted network and nodes outside the trusted network and to protect user devices of the waiting users from malware arriving from outside the trusted network; and wherein generating the list of idle computerized sessions includes identifying particular virtual web interfaces which have gone unused by users assigned to the particular virtual web interfaces for a predefined amount of time.

* * * * *